United States Patent [19]

Sugimori

[11] Patent Number: 5,282,075
[45] Date of Patent: Jan. 25, 1994

[54] QUANTITY-OF-LIGHT ADJUSTING DEVICE

[75] Inventor: Masami Sugimori, Kanagawa, Japan

[73] Assignee: Canon Kabushiki Kaisha, Tokyo, Japan

[21] Appl. No.: 994,545

[22] Filed: Dec. 21, 1992

[30] Foreign Application Priority Data

Jan. 7, 1992 [JP] Japan .................................. 4-000808

[51] Int. Cl.⁵ ............................................. G02B 26/02
[52] U.S. Cl. ..................................... 359/227; 358/228; 354/270; 354/410
[58] Field of Search ................ 359/227, 230; 358/228; 354/270, 271.1, 410, 420–423, 435, 440–446

[56] References Cited

U.S. PATENT DOCUMENTS 4,304,472 12/1981 Shinoda et al. ...................... 354/475
5,168,365 12/1992 Kawahara ........................... 358/228

Primary Examiner—Scott J. Sugarman
Assistant Examiner—James Phan
Attorney, Agent, or Firm—Robin, Blecker, Daley & Driscoll

[57] ABSTRACT

A quantity-of-light adjusting device comprises a driving part for driving a quantity-of-light adjusting member according to a change of the quantity of light passing through an aperture provided in the quantity-of-light adjusting member, a detecting circuit arranged to detect, as digital information, a change of the aperture of the quantity-of-light adjusting member, a converting circuit for converting the digital information output of the detecting circuit into speed information by differentiating the digital information, and a control circuit arranged to control a driving speed of the quantity-of-light adjusting member by feeding back the speed information output of the converting circuit to the driving part.

8 Claims, 6 Drawing Sheets

CAMERA SIDE

LENS SIDE

QUANTITY-OF-LIGHT ADJUSTING DEVICE

BACKGROUND OF THE INVENTION

1. Field of the Invention

This invention relates to a quantity-of-light adjusting device for adjusting a quantity of light by driving an iris, or to an optical apparatus having the quantity-of-light adjusting device.

2. Description of the Related Art

The video apparatuses such as video cameras have made conspicuous advancement of late. As a result, these apparatuses, especially camera-integrated video tape recorders, have come to be equipped with automatic quantity-of-light adjusting devices in general.

The conventional quantity-of-light adjusting method which has been employed for such a camera-integrated video tape recorder is as described below with reference to FIG. 5:

Incident light representative of an image of a shooting object comes through a lens optical system 1. The incident light is imaged on the pickup image plane of an image sensor 3 after the quantity of the light is adjusted by means of iris blades 2 of a quantity-of-light adjusting mechanism (hereinafter referred to as iris). The object image which is thus formed on the image sensor 3 is photo-electrically converted into an pickup image signal. The pickup image signal is sent to a camera signal processing circuit 4. The camera signal processing circuit 4 performs various processes such as a gamma conversion process, etc., on the image signal to obtain a chrominance signal C and a luminance signal Yγ as a video signal. The video signal is further processed by a camera encoder 5 which conforms, for example, to the NTSC system and is then outputted to the outside from a camera part in the form of a composite video signal.

Meanwhile, a luminance signal Y obtained also at the camera signal processing circuit 4 is sent to a detection circuit 6 for generating a control signal for the purpose of controlling the iris blades 2 in such a way as to make an exposure apposite to the luminance state of the image plane. The luminance signal Y is sent also to an AF (automatic focusing) block 7 for focusing. At the detection circuit 6, the luminance signal Y is subjected, for example, to an integrating detection process. After the integrating detection, the luminance signal is sent to a comparison circuit 8 which is disposed within a microcomputer 14. The comparison circuit 8 compares the luminance signal with a reference value (an apposite exposure value). A difference thus obtained is sent to a multiplier 9. The multiplier 9 then multiplies the difference by a coefficient corresponding to the position of the iris blades 2. The output signal of the multiplier 9 is sent from the microcomputer 14 to a driver 10. The driver 10 makes this signal from the microcomputer 14 into an apposite voltage. The driver sends the voltage to an actuator 11 to drive the iris blades 2.

The actuator 11 and the driver 10 are arranged as shown in FIG. 6. The iris driving signal outputted from the microcomputer 14 is integrated by an operational amplifier 21 and is then applied to a driving coil 22 of the actuator 11. As a result, a magnetic field is generated at the driving coil 22. The magnetic field causes a magnet rotor 23 to rotate. An arm 24 is mounted on the rotor 23. The tip of the arm 24 then moves the iris blades 2 to vary the aperture position of the iris. Further, the arm 24 is pulled by a spring 25 and its movement is arranged to be brought to a stop by one of stoppers 26. When the rotor 23 rotates, an electromotive voltage is generated at a damping coil 27. The voltage is fed back to the operational amplifier 21 for feedback control over the iris. Further, a magnetic flux density for a Hall element 28 changes when the rotor 23 rotates. The output of the Hall element 28 comes to the operational amplifier 29 to be amplified there. The amplified output of the Hall element 28 is sent to the microcomputer 14 as information on the position of the iris blades 2, i.e., as an aperture value.

In order to arrange a video camera in a smaller size, the size of a quantity-of-light adjusting device also must be reduced. However, the reduction in size of the quantity-of-light adjusting device makes it hardly possible to have a sufficient number of turns of the damping coil. Then, it becomes hardly possible to obtain an adequate performance for adjustment of the quantity of light.

To solve this problem, a device has been proposed as disclosed in Japanese Patent Application Laid-Open No. HEI 2-239782. This device is arranged to omit the damping coil and to perform feedback control over the speed of the rotor by using, in place of the damping coil, the output of the Hall element which detects the angle of rotation of the rotor. However, analog information obtained from the analog signal of the Hall element is directly used for the feedback control.

SUMMARY OF THE INVENTION

One aspect of this invention resides in the provision of a quantity-of-light adjusting device which is arranged to obtain the amount of change of an aperture provided for adjustment of the quantity of light by differentiating, by time, information on an amount of the aperture and to control the speed of the adjustment of the quantity of light by feeding back information on the amount of change of the aperture to driving means.

The above and other aspects or objects and features of this invention will become apparent from the following detailed description of embodiments thereof taken in conjunction with the accompanying drawings.

DETAILED DESCRIPTION OF THE PREFERRED EMBODIMENTS

Figure 1:
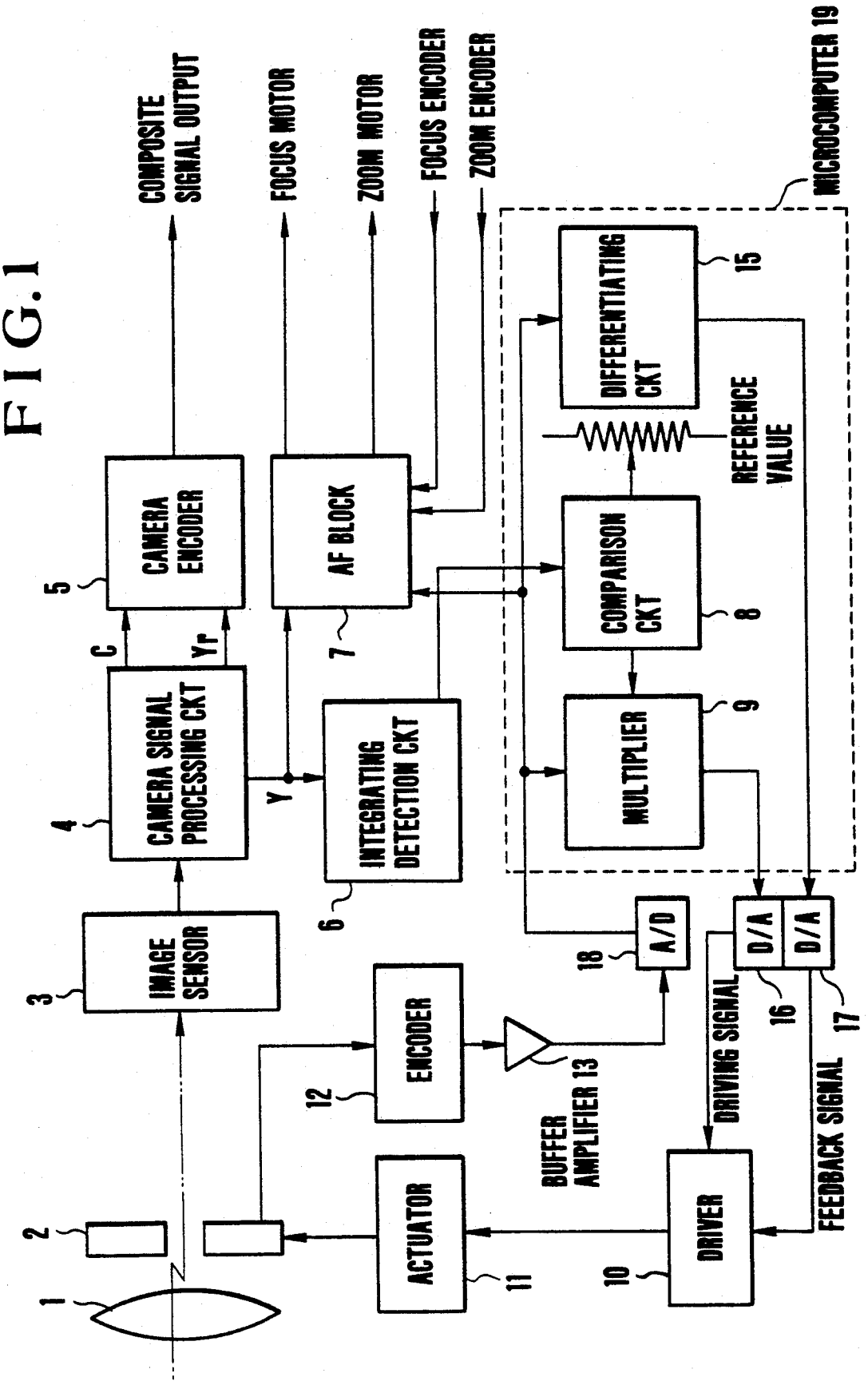
FIG. 1 is a block diagram showing an automatic quantity-of-light adjusting device arranged according to this invention as an embodiment thereof.

FIG. 1 is a block diagram showing an automatic quantity-of-light adjusting device which is arranged as a first embodiment of this invention.

Referring to FIG. 1, the quantity of image pickup light coming from an object through a lens optical system 1 is adjusted by the iris blades 2 of a quantity-of-light adjusting mechanism (iris). After the adjustment of the quantity of light, the image pickup light is imaged on the pickup image plane of an image sensor 3. An object image thus formed is photo-electrically converted into an electrical signal. This signal is sent as a pickup image signal from the image sensor 3 to a camera signal processing circuit 4. At the camera signal processing circuit 4, processes such as a gamma conversion process, etc., are performed on the pickup image signal to obtain a chrominance signal C and a luminance signal Yγ. The chrominance and luminance signals are taken out as a video signal. The video signal is outputted to the outside from a camera part in the form of a composite video signal through a camera encoder 5 which conforms, for example, to the NTSC system.

Further, a luminance signal Y obtained also at the above-stated camera signal processing circuit 4 is inputted to a detection circuit 6 for generating a control signal for controlling the iris blades 2 in such a way as to obtain an apposite exposure according to the luminance state of the image plane. The luminance signal Y is sent also to an AF (automatic focusing) block 7 to be used for a focusing action. At the detection circuit 6, the luminance signal Y is, for example, subjected to an integrating detection process. After that, the output of the detection circuit 6 is sent to a comparison circuit 8 disposed within a microcomputer 19 so as to be compared with a reference value representing an apposite exposure value. A difference thus obtained comes to a multiplier 9 to be multiplied by a coefficient according to the position of the iris blades 2. The output of the multiplier 9 is sent from the microcomputer 19 to a D/A converter 16 to be converted into an analog signal. The analog signal is sent to a driver 10. The driver 10 makes the signal from the microcomputer 19 into an apposite voltage and sends it to an actuator 11 to drive the iris blades 2 accordingly. Further, the amount of aperture defined by the iris blades 2 is detected by an encoder 12 and is amplified by a buffer amplifier 13. The amplified amount of aperture is converted into a digital value by an A/D converter 18. The digital value is taken into the microcomputer 19 to be differentiated by a differentiating process 15. A differentiated amount of aperture thus obtained is sent from the microcomputer 19 to a D/A converter 17 to be converted into an analog value. The analog value is fed back to the driver 10.

Figure 2:
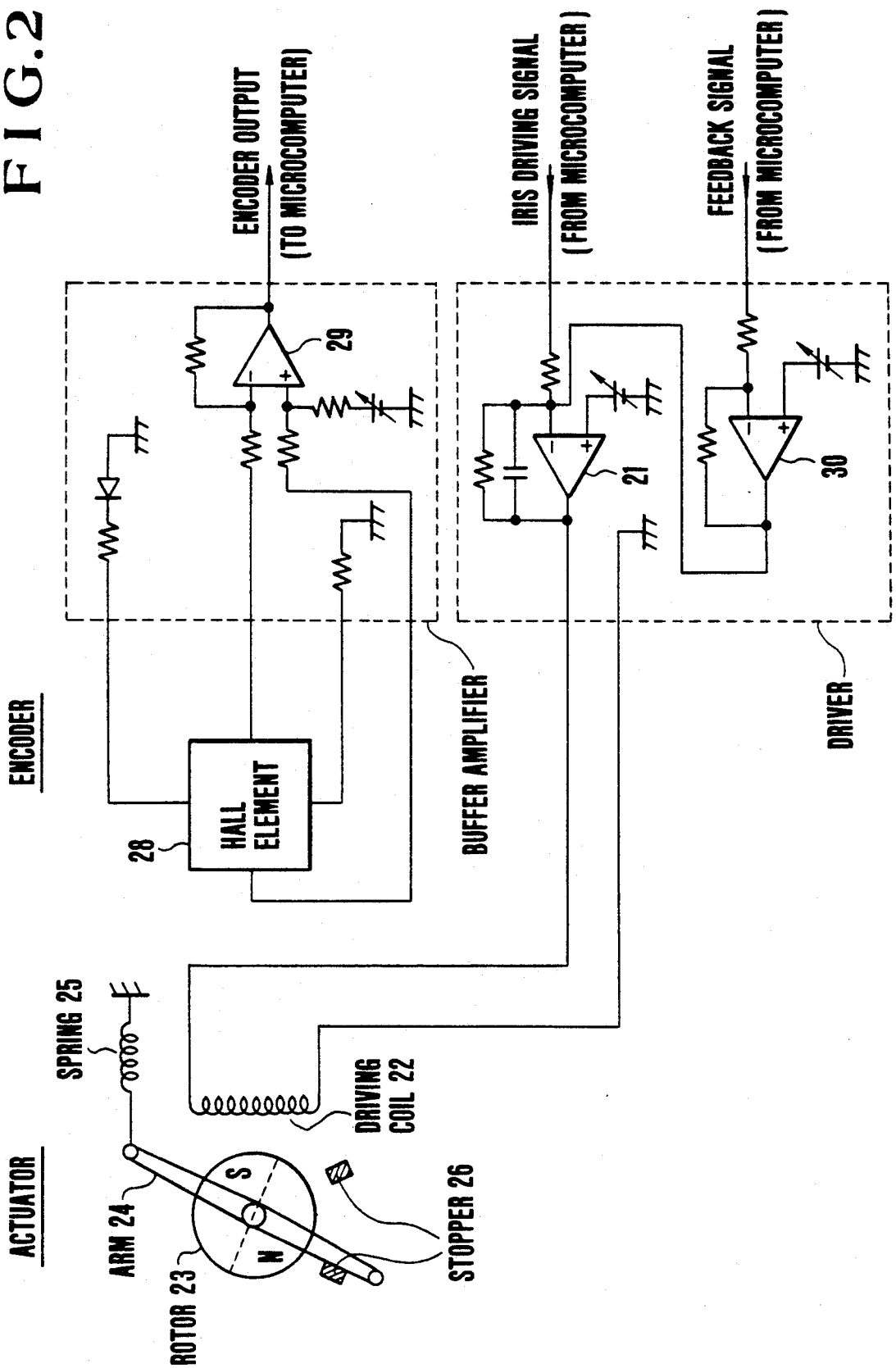
FIG. 2 is a circuit diagram showing the arrangement of an actuator and a driver shown in FIG. 1.

The actuator 11 and the driver 10 are arranged as shown in FIG. 2. Referring to FIG. 2, the iris driving signal outputted from the microcomputer 19 is integrated by an operational amplifier 21 and, after that, is applied to a driving coil 22 of the actuator 11. As a result, a magnetic field is generated at the driving coil 22 to cause a magnet rotor 23 to rotate. An arm 24 is mounted on the rotor 23. Therefore, with the rotor 23 rotated, the tip of the arm 24 is turned to move the iris blades 2 and to change the size of the aperture. Further, the arm 24 is pulled by a spring 25. The turning movement of the arm 24 is limited to a given angle of rotation by stoppers 26. When the rotor 23 rotates, the output voltage of a Hall element 28 changes. The output voltage is sent to an operational amplifier 29 to be outputted as an amount of aperture. The amount of aperture outputted from the operational amplifier 29 is sent to the microcomputer 19. At the microcomputer 19, the output of the Hall element 28 is differentiated and is fed back to an operational amplifier 30 of the driver 10 as speed information. Feedback control over the iris is performed in this manner.

Figure 3:
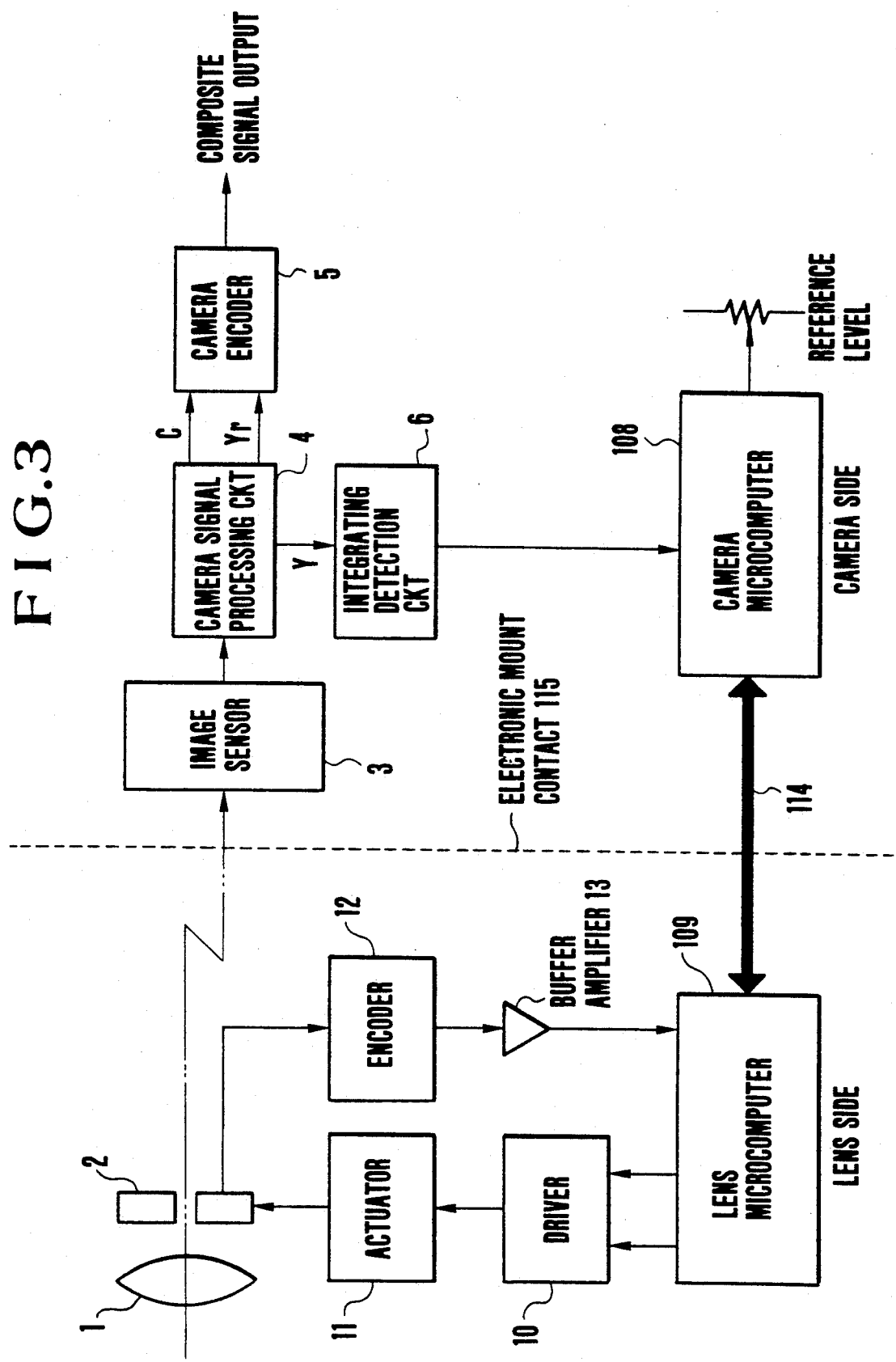
FIG. 3 is a block diagram showing an automatic quantity-of-light adjusting device arranged according to this invention as another embodiment thereof.

FIG. 3 shows an automatic quantity-of-light adjusting device arranged as a second embodiment of this invention.

Referring to FIG. 3, a luminance signal which has undergone an integrating detection process is taken into a camera microcomputer 108 to be compared and multiplied within the camera microcomputer 108 in the same manner as in the case of the first embodiment shown in FIG. 1. The iris driving information thus obtained is transferred to a lens microcomputer 109 through a communication line 114 and mount contacts 115 disposed on both the lens and camera sides. Upon receipt of the iris driving information, the lens microcomputer 109 sends it to the driver 10. The driver 10 then outputs a voltage for driving the iris blades 2. The iris blades 2 are driven by this voltage. An aperture value is detected by an encoder 12. The detected aperture value is amplified by the buffer amplifier 13. The amplified aperture value is taken into the lens microcomputer 109. The lens microcomputer 109 then obtains the amount of change of the aperture by differentiating the aperture value and feeds back the amount of change of the aperture to the driver 10. The quantity of light is adjusted through a series of these processes.

Figure 4A:
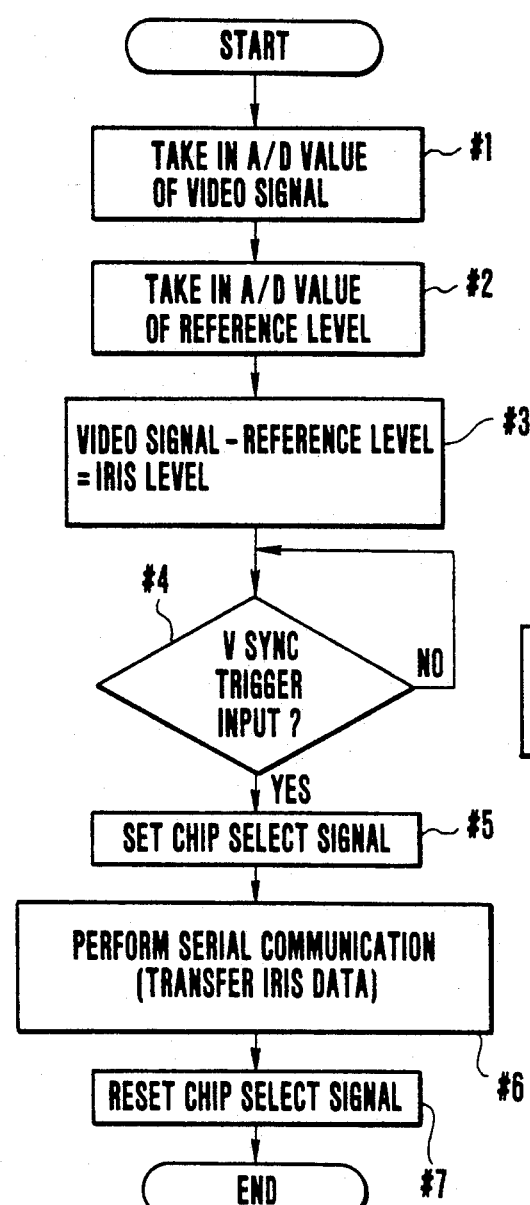
FIGS. 4(a) and 4(b) are flow charts showing the operation of the device shown in FIG. 3.
Figure 4B:
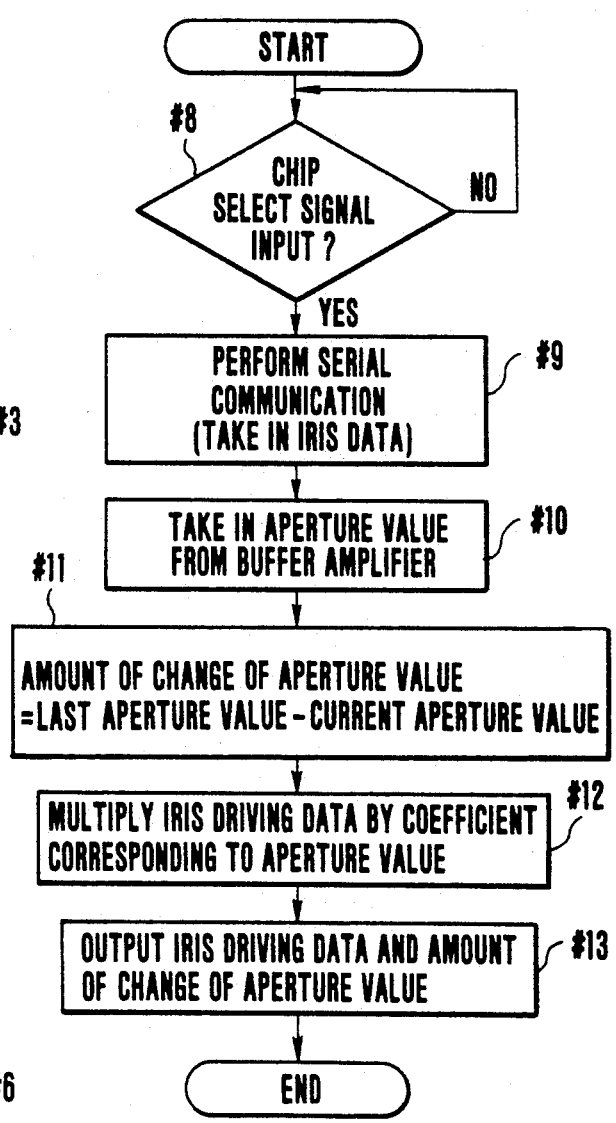
Figure 5:
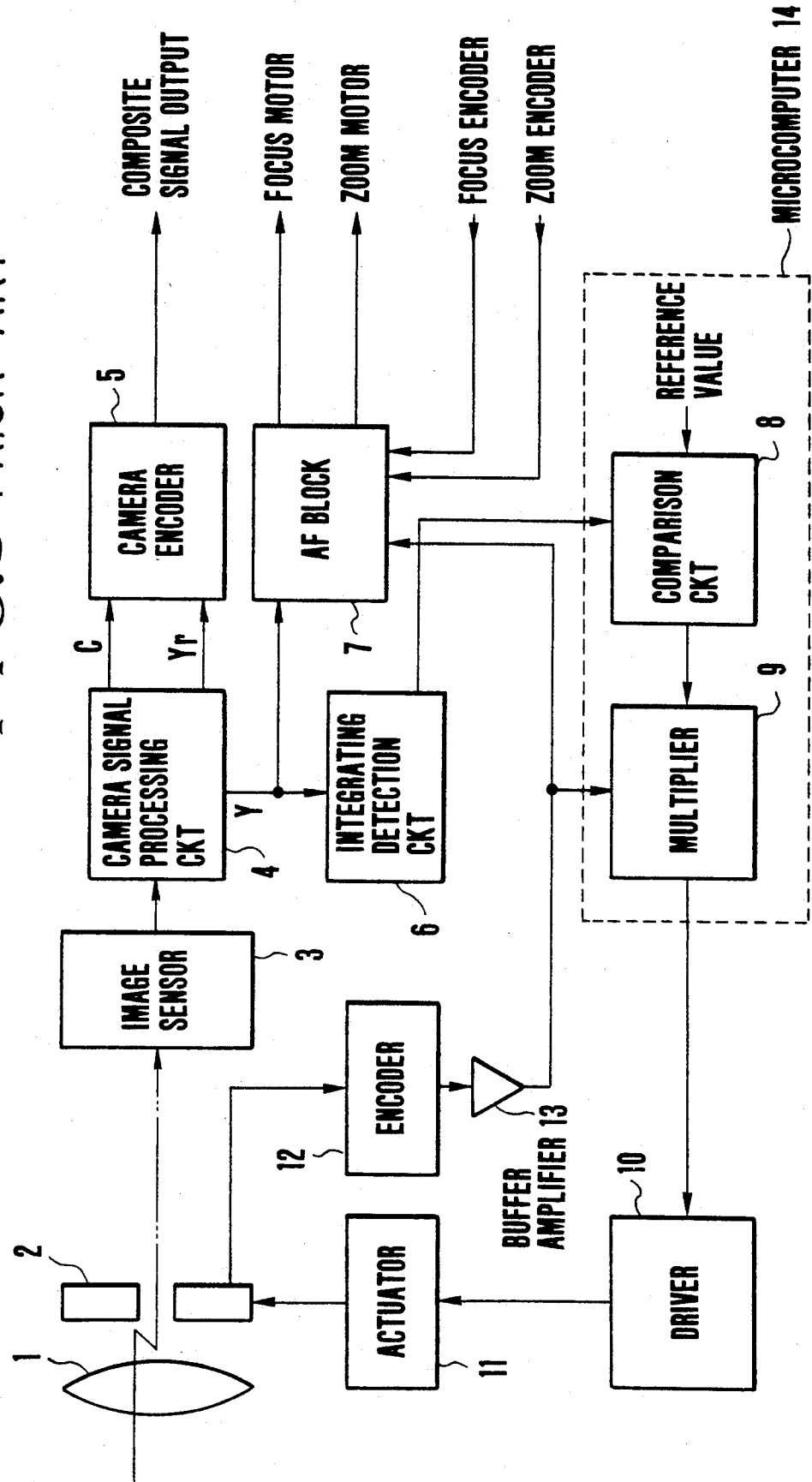
FIG. 5 is a block diagram showing the conventional quantity-of-light adjusting device.
Figure 6:
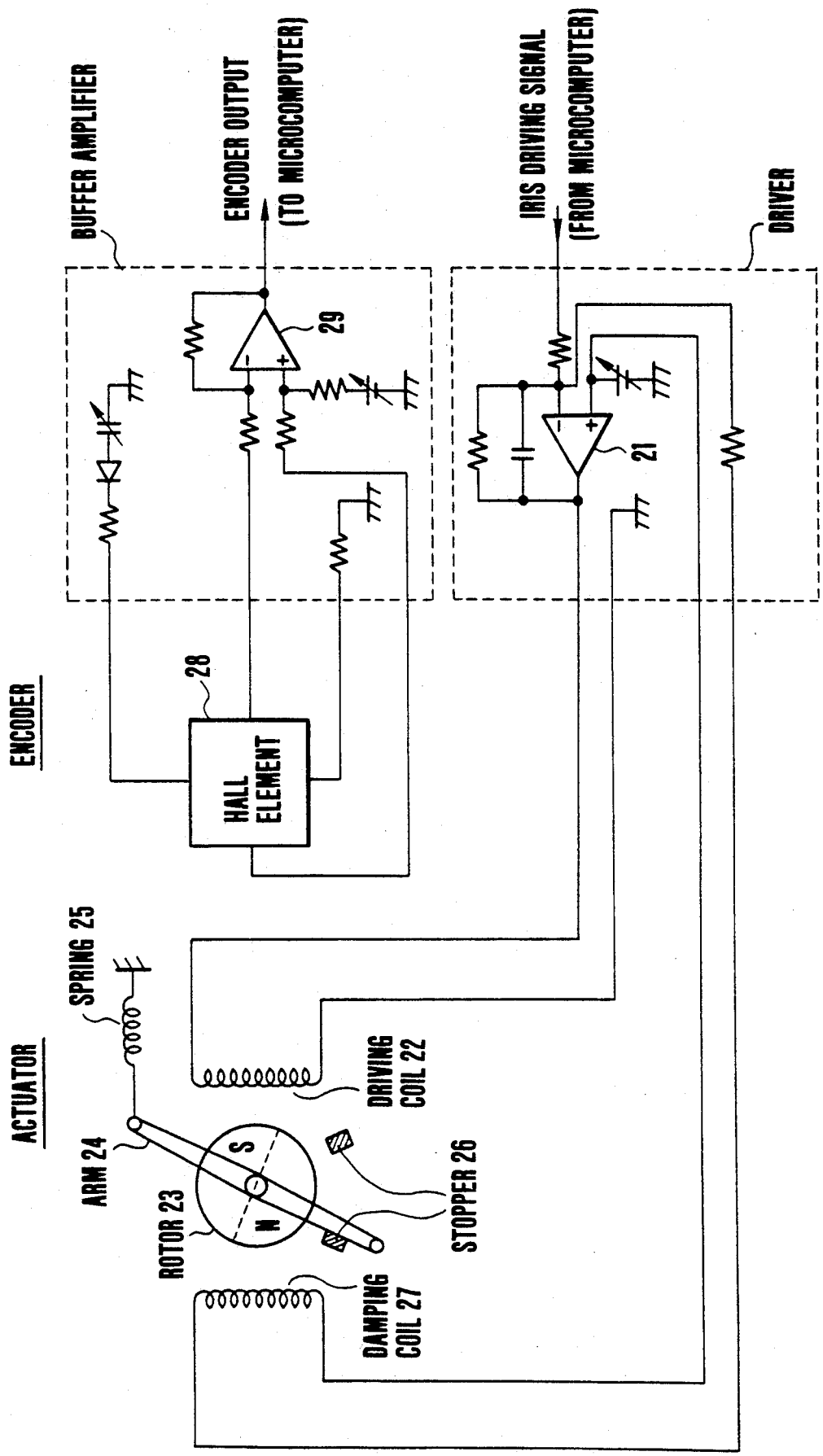
FIG. 6 is a circuit diagram showing the actuator and the driver of the device shown in FIG. 5.

These processes are further described in detail as follows, with reference to FIGS. 4(a) and 4(b) which are flow charts showing the flow of operations.

Step #1: A luminance signal outputted from the camera signal processing circuit 4 is integrated by the integrating detection circuit 6. The output of the integrating detection circuit 6 is taken into the camera microcomputer 108. Step #2: A reference level is taken into the camera microcomputer 108. Step #3: At the camera microcomputer 108, an arithmetic operation is performed to subtract the reference level value from the integrated value of the video signal. Step #4: The flow waits for arrival of the input timing of a V sync signal (video vertical synchronizing signal). Step #5: A chip select signal is outputted. Step #6: Iris data is parallel-to-serial converted and transmitted from the camera side to the lens side via the communication line 114. Step #7: The chip select signal is reset.

One round of communication for transferring the iris control information to the lens side comes to an end with the step #7 executed. The communication is repeated periodically.

The processes to be performed on the lens side (or on the side of a lens unit) on the basis of data received from the camera side are described below.

Step #8: A check is made for the input of the chip select signal. Step #9: The iris data is taken into the lens microcomputer 109 through a serial-to-parallel conversion process. Step #10: At the same time, an aperture value which is detected by the iris encoder 12 and amplified to a given level by the buffer amplifier 13 is taken into the lens microcomputer 109. Step #11: The lens microcomputer 109 obtains, through a differentiating process, an amount of change taking place between the aperture value obtained by the current round of steps and the aperture value obtained by the last round of steps immediately preceding the current round of steps. Step #12: The lens microcomputer 109 obtains iris driving data by collating, with a conversion table arranged beforehand within the lens microcomputer 109, the iris driving data which has been collated with the aperture value received. Step #13: The iris driving data and information on the amount of change taking place in aperture value are sent to the driver 10.

As described in the foregoing, the communication for control information is conducted between the camera unit and the lens unit by repeating the control and flow of processes in a given cycle. By this, the control of varied kinds including the iris control, etc., are carried out.

The quantity-of-light adjusting devices described as the embodiments of this invention is arranged to obviate the necessity of a damping coil and to feed back the iris aperture information to the driving means by differentiating the information, so that the size of the device can be reduced without deteriorating the quantity-of-light adjusting characteristic of the device or that of an optical apparatus using the device.

What is claimed is:

1. A quantity-of-light adjusting device comprising:
   a) driving means for driving a quantity-of-light adjusting member according to a change of the quantity of light passing through an aperture provided in said quantity-of-light adjusting member;
   b) detecting means for detecting, as digital information, an amount of said aperture of said quantity-of-light adjusting member;
   c) converting means for converting the digital information outputted from said detecting means into speed information by differentiating the digital information by time; and
   d) control means for controlling a driving speed of said quantity-of-light adjusting member by feeding back to said driving means the speed information outputted from said converting means.

2. A device according to claim 1, wherein said driving means employs as an actuator a magnet rotor arranged to be rotated by a driving coil, and wherein said detecting means is arranged to analog-to-digital convert into the digital information an angle of rotation of said magnet rotor which is detected as an analog quantity.

3. A device according to claim 2, wherein said control means is arranged to convert the speed information obtained through differentiation by said converting means into analog information and to apply the analog information to said driving coil.

4. A device according to claim 1, wherein said converting means is arranged to perform differentiation by a microcomputer.

5. An optical apparatus comprising:
   a) an image sensor arranged to receive light passing through an aperture provided in a quantity-of-light adjusting member;
   b) driving means arranged to compare the quantity of light received by said image sensor with a reference value and to vary the size of said aperture by driving said quantity-of-light adjusting member so as to make the quantity of light approximately coincide with the reference value;
   c) detecting means for detecting, as digital information, an amount of said aperture of said quantity-of-light adjusting member;
   d) converting means for converting the digital information outputted from said detecting means into speed information by differentiating the digital information by time; and
   e) control means for controlling a driving speed of said quantity-of-light adjusting member by feeding back to said driving means the speed information outputted from said converting means.

6. An optical apparatus according to claim 5, wherein said driving means employs as an actuator a magnet rotor arranged to be rotated by a driving coil, and wherein said detecting means is arranged to analog-to-digital convert into the digital information an angle of rotation of said magnet rotor which is detected as an analog quantity.

7. An optical apparatus according to claim 6, wherein said control means is arranged to convert the speed information obtained through differentiation by said converting means into analog information and to apply the analog information to said driving coil.

8. An optical apparatus according to claim 5, wherein said converting means is arranged to perform differentiation by a microcomputer.

* * * * *